(12) United States Patent
Watanabe et al.

(10) Patent No.: US 9,458,807 B2
(45) Date of Patent: Oct. 4, 2016

(54) FOUR-STROKE ENGINE

(75) Inventors: Takahiro Watanabe, Shizuoka (JP);
Daisuke Takasu, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 657 days.

(21) Appl. No.: 13/466,175

(22) Filed: May 8, 2012

(65) Prior Publication Data

US 2012/0298074 A1  Nov. 29, 2012

(30) Foreign Application Priority Data

May 24, 2011  (JP) .................................. 2011-116254

(51) Int. Cl.
*F02M 61/14* (2006.01)
*F02B 23/10* (2006.01)

(52) U.S. Cl.
CPC ............ *F02M 61/14* (2013.01); *F02B 23/104* (2013.01); *Y02T 10/125* (2013.01)

(58) Field of Classification Search
CPC .. F02B 23/104; F02M 61/14; F02M 61/145; F02M 35/10072; F02M 35/10078; F02M 35/10085; F02M 35/10091; F02M 35/10144; F02M 35/10111; F02M 35/10216; F02M 35/10249; F02M 35/10255
USPC ......................... 123/445, 302, 305, 432, 470
See application file for complete search history.

(56) References Cited

U.S. PATENT DOCUMENTS

| | | | |
|---|---|---|---|
| 5,150,691 A | | 9/1992 | Imajo |
| 5,233,956 A * | | 8/1993 | Ueda et al. ................ 123/302 |
| 5,785,024 A * | | 7/1998 | Takei et al. ................ 123/470 |
| 6,006,719 A * | | 12/1999 | Matsumura ................ 123/302 |
| 6,053,145 A | | 4/2000 | Suzuki et al. |
| 6,189,503 B1 * | | 2/2001 | Takano ................ F01L 1/0532 123/188.14 |
| 6,305,359 B1 * | | 10/2001 | Kronberger et al. ........ 123/506 |
| 6,705,279 B2 * | | 3/2004 | Iriya ............................. 123/301 |
| 7,069,908 B2 * | | 7/2006 | Ohkubo et al. ............. 123/470 |
| 7,273,032 B2 * | | 9/2007 | Suzuki et al. .............. 123/308 |
| 7,296,558 B2 * | | 11/2007 | Saeki et al. ................ 123/431 |
| 7,373,928 B2 * | | 5/2008 | Thomas ...................... 123/491 |
| 7,434,564 B2 * | | 10/2008 | Denger et al. ............... 123/275 |

(Continued)

FOREIGN PATENT DOCUMENTS

| EP | 0 921 286 A2 | 6/1999 | |
|---|---|---|---|
| EP | 921286 A2 * | 6/1999 | ............ F02B 17/00 |

(Continued)

OTHER PUBLICATIONS

Official Communication issued in corresponding European Patent Application No. 12168595.2, mailed on Sep. 20, 2012.

(Continued)

*Primary Examiner* — Hung Q Nguyen
*Assistant Examiner* — Anthony L Bacon
(74) *Attorney, Agent, or Firm* — Keating and Bennett, LLP (57) ABSTRACT

A four-stroke engine includes a cylinder head in which a combustion chamber, an intake port that communicates with the combustion chamber, and a housing hole that passes through the combustion chamber and through the intake port are provided, and a fuel injector that supplies a mist of fuel directly to the combustion chamber by jetting the mist of fuel toward the combustion chamber. The fuel injector includes at least a portion that is disposed at the intake port and at the housing hole.

12 Claims, 7 Drawing Sheets

(56) References Cited

U.S. PATENT DOCUMENTS

| | | | |
|---|---|---|---|
| 7,484,499 B2 * | 2/2009 | Beardmore | 123/470 |
| 7,506,630 B2 * | 3/2009 | Denger et al. | 123/275 |
| 7,726,274 B2 * | 6/2010 | Brinkmann | F02F 1/24 |
| | | | 123/193.3 |
| 8,069,842 B2 * | 12/2011 | Kannan | 123/470 |
| 8,430,074 B2 * | 4/2013 | McCarthy et al. | 123/188.14 |
| 8,820,274 B2 * | 9/2014 | Watanabe et al. | 123/41.72 |
| 2002/0072281 A1 * | 6/2002 | Takahashi | F02B 61/045 |
| | | | 440/88 F |
| 2002/0152995 A1 * | 10/2002 | Kato | 123/470 |
| 2007/0215110 A1 * | 9/2007 | Stein et al. | 123/431 |
| 2007/0277776 A1 | 12/2007 | Thomas | |

FOREIGN PATENT DOCUMENTS

| | | | |
|---|---|---|---|
| EP | 1 160 429 A2 | 12/2001 | |
| EP | 1160429 A2 * | 12/2001 | F02B 31/06 |
| FR | 2.050.287 A1 | 4/1971 | |
| JP | 64-012064 A | 1/1989 | |
| JP | 09-088612 A | 3/1997 | |
| JP | 2008-157197 A | 7/2008 | |

OTHER PUBLICATIONS

English translation of European Patent Application Publication No. 0921286.

* cited by examiner

FOUR-STROKE ENGINE

BACKGROUND OF THE INVENTION

1. Field of the Invention

The present invention relates to a four-stroke engine.

2. Description of the Related Art

A direct-injection engine is known in which liquid fuel is supplied directly to a combustion chamber so as to improve its output and fuel efficiency.

In the direct-injection engine, fuel is evaporated in a cylinder, and, as a result, the inside of the cylinder is cooled. Therefore, the output of the engine can be improved by increasing the amount of air with which the cylinder is filled. In addition, the temperature of the inside of the cylinder decreases, and therefore knocking can be prevented. Therefore, fuel efficiency can be improved by increasing the compression ratio of an air-fuel mixture.

U.S. Pat. No. 6,053,145 discloses an engine in which liquid fuel is supplied directly to a combustion chamber. In the engine of U.S. Pat. No. 6,053,145, a fuel injector that jets fuel is disposed near intake ports. Two intake ports are provided for each cylinder. The fuel injector is disposed between the two intake ports or is disposed therebelow (i.e., is disposed on a cylinder-body side).

SUMMARY OF THE INVENTION

The inventors of preferred embodiments of the present invention described and claimed in the present application conducted an extensive study and research regarding a four-stroke engine, such as the one described above, and in doing so, discovered and first recognized new unique challenges and previously unrecognized possibilities for improvements as described in greater detail below.

As described above, in the engine of U.S. Pat. No. 6,053,145, the fuel injector is disposed between the two intake ports or is disposed therebelow. However, in a casein which the fuel injector is disposed between the two intake ports, a space in which the fuel injector is disposed is ensured by greatly curving each intake port or by adjusting the distance between the two intake ports. Therefore, the shape or layout of the intake ports is restricted because of the fuel injector. Likewise, in a case in which the fuel injector is disposed below the intake ports, the shape or layout of the intake ports is restricted because of the fuel injector. However, if the intake port is greatly curved, fluid resistance at the intake port will increase, and the flow of intake air toward the combustion chamber will be obstructed. Therefore, the flow rate of air filled from the intake port into the cylinder will decrease, and the effect brought about by direct injection will decrease.

In order to overcome the previously unrecognized and unsolved challenges described above, one preferred embodiment of the present invention provides a four-stroke engine that includes a cylinder head in which a combustion chamber, an intake port that communicates with the combustion chamber, and a housing hole that passes through the combustion chamber and through the intake port are defined; and a fuel injector at least a portion of which is disposed at the intake port and at the housing hole and that supplies a mist of fuel directly to the combustion chamber by jetting the mist of fuel toward the combustion chamber.

According to this arrangement, the housing hole that passes through the combustion chamber and through the intake port is located in the cylinder head, and at least a portion of the fuel injector is disposed at the intake port and at the housing hole. The fuel injector jets a fuel mist toward the combustion chamber. The fuel mist (i.e., liquid droplets of fuel) jetted from the fuel injector is supplied directly to the combustion chamber. Therefore, the inside of the cylinder can be cooled by evaporating the fuel in the cylinder. Therefore, the output and the fuel efficiency of the four-stroke engine are significantly improved. Additionally, at least a portion of the fuel injector is disposed at the intake port, and therefore the shape or layout of the intake port is not required to be changed in order to provide a space to dispose the fuel injector. Thus, an intake system has a high degree of freedom, and therefore the fluid resistance in the intake port can be decreased. Therefore, a decrease in the amount of air that flows from the intake port to the cylinder can be reduced.

A front end of the fuel injector may reach the combustion chamber.

The fuel injector may penetrate through an inner wall of the intake port.

The intake port may include a plurality of branch passages that communicate with the combustion chamber and a combined passage in which the plurality of branch passages are combined together. In this case, the fuel injector may penetrate through an inner wall of the combined passage, or may enter at least one of the plurality of branch passages.

The four-stroke engine may further include a first sealing member with which a gap between the fuel injector and the housing hole is sealed.

The four-stroke engine may further include a cylinder body including a cylinder. In this case, the housing hole may communicate with the combustion chamber at a more distant position than the intake port with respect to a central axis of the cylinder.

The cylinder head may include a connection hole by which the intake port and an outside of the cylinder head are connected together. In this case, the fuel injector may enter the connection hole.

The four-stroke engine may further include a second sealing member with which a gap between the fuel injector and the connection hole is sealed.

The fuel injector may include a body portion entering the intake port.

The fuel injector may include a forward end portion entering the intake port.

The four-stroke engine may further include a cylinder body including a cylinder. In this case, the fuel injector may be inclined with respect to the central axis of the cylinder.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
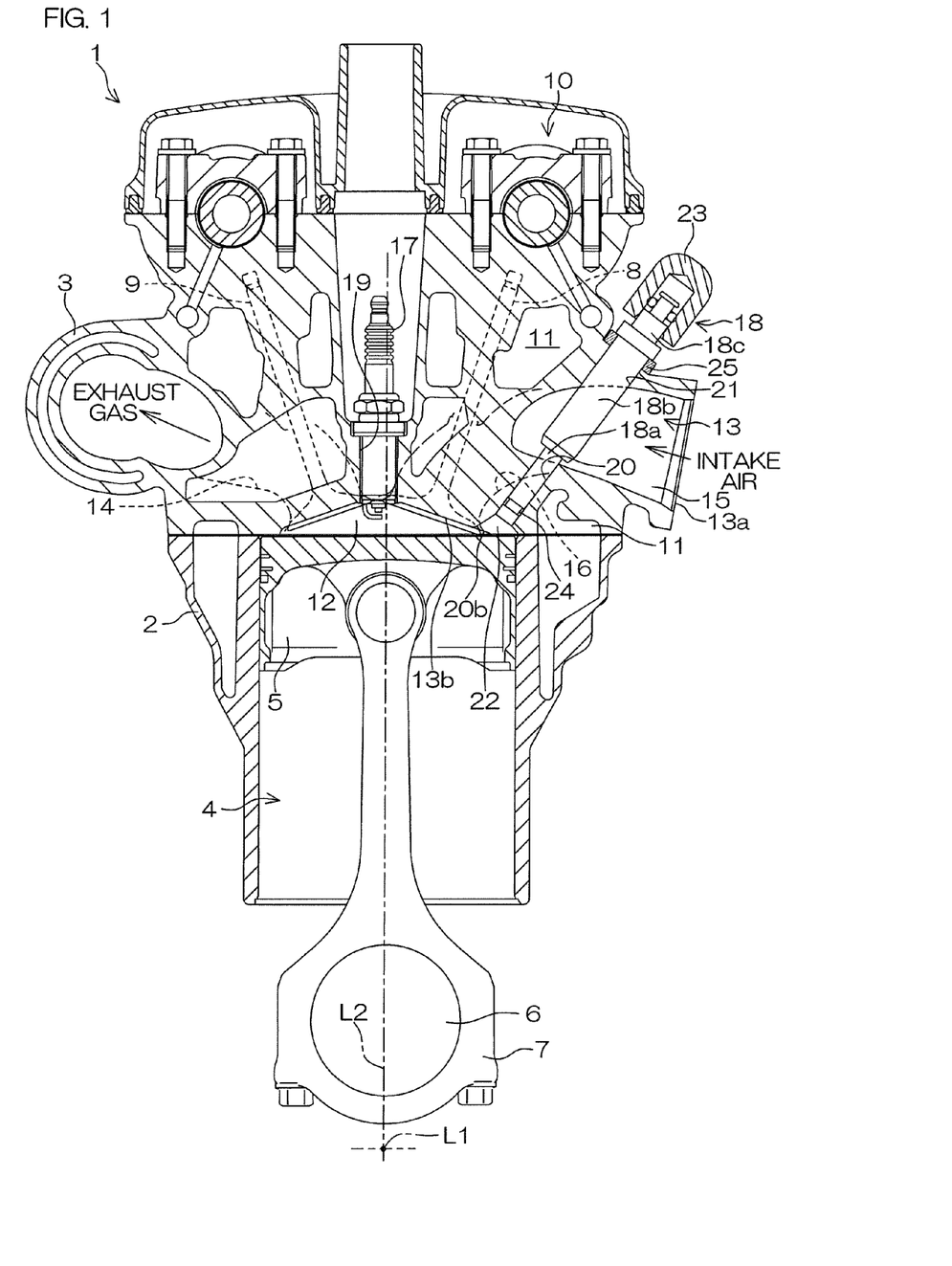
FIG. 1 is a sectional view of an engine according to a first preferred embodiment of the present invention.
Figure 2:
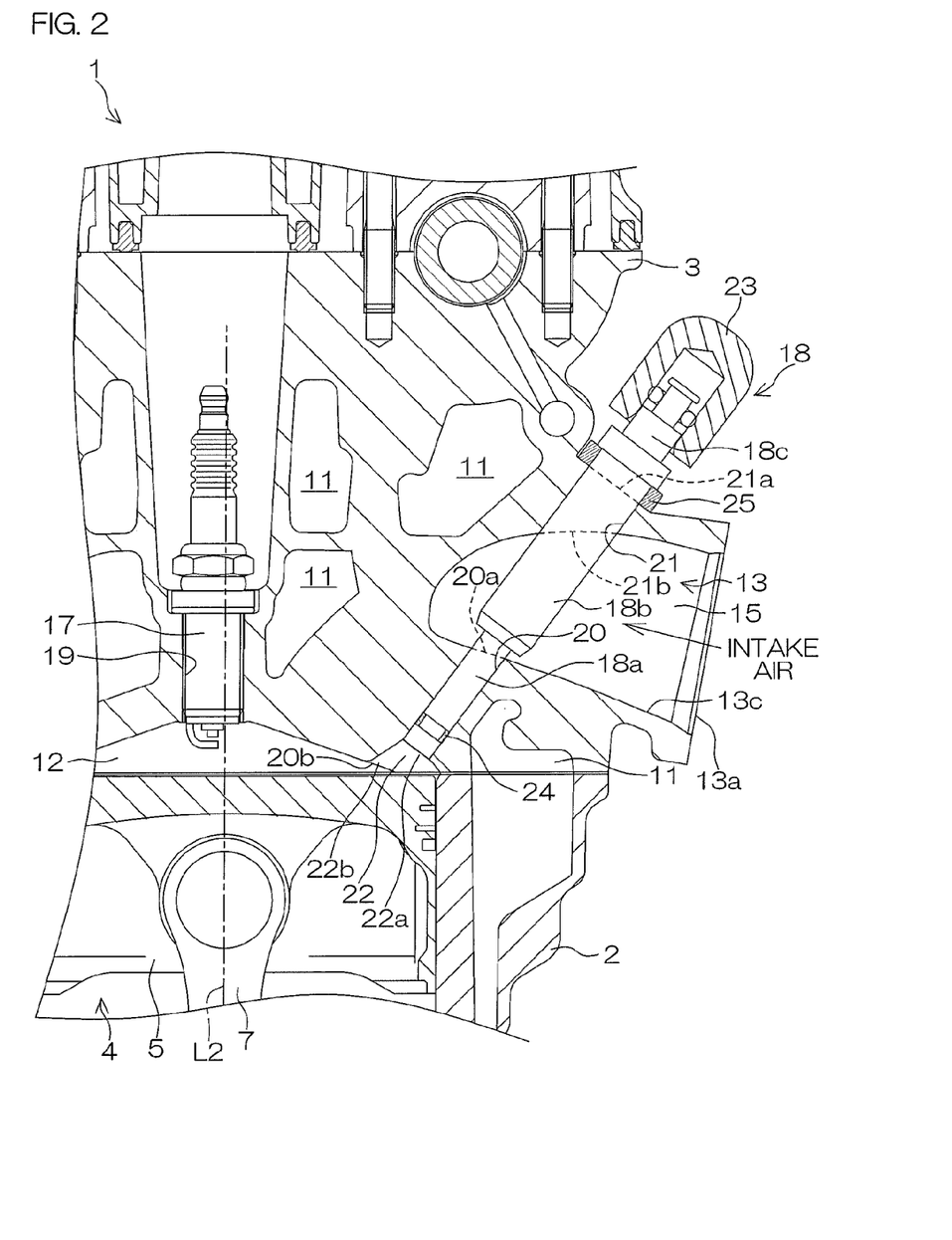
FIG. 2 is an enlarged view of a portion of FIG. 1.

FIG. 1 is a sectional view of an engine 1 according to a first preferred embodiment of the present invention. FIG. 2 is an enlarged view of a portion of FIG. 1. In the following description, a direction in which a rotational axis L1 of a crankshaft 6 extends (i.e., a direction perpendicular to the plane of the sheet of paper of the drawing) is defined as a front-rear direction, and a direction in which a central axis L2 of a cylinder perpendicular to the rotational axis L1 extends (i.e., an up-down direction in the plane of the sheet of paper of the drawing) is defined as an up-down direction. However, this direction definition is one example, and the direction in which the rotational axis L1 extends may be a direction other than the front-rear direction.

The engine 1 is a four-stroke engine (internal combustion engine). The engine 1 may be mounted in a vehicle, such as an automobile or a motorcycle, or may be mounted in a vessel, or may be mounted in other devices. For example, the engine 1 may be mounted in a vessel propulsion apparatus that propels a vessel. Additionally, the engine 1 may be a single cylinder engine or a multi-cylinder engine. If the engine 1 is a multi-cylinder engine, the engine 1 may be a straight-type engine that includes a plurality of cylinders arranged linearly, or may be a V-type engine that includes a plurality of cylinders arranged along the line of the capital letter V, or may be another type of engine.

The engine 1 includes a cylinder body 2 and a cylinder head 3. The cylinder head 3 is disposed above the cylinder body 2. The cylinder head 3 is connected to an upper end of the cylinder body 2. The cylinder body 2 and the cylinder head 3 define a cylinder 4. The engine 1 includes a piston 5 disposed in the cylinder 4, a crankshaft 6 rotatable around the rotational axis L1, and a connecting rod 7 by which the piston 5 and the crankshaft 6 are connected together. The engine 1 additionally includes an intake valve 8, an exhaust valve 9, and a valve driving mechanism 10 that drives the intake valve 8 and the exhaust valve 9.

The cylinder head 3 defines a water jacket 11 through which cooling water flows. The cylinder head 3 further defines a combustion chamber 12 in which an air-fuel mixture consisting of air and fuel is burnt, an intake port 13 that communicates with the combustion chamber 12, and an exhaust port 14 that communicates with the combustion chamber 12. The intake port 13 and the exhaust port 14 are opened and closed by the intake valve 8 and the exhaust valve 9, respectively. Intake air supplied to the engine 1 is supplied from the intake port 13 to the combustion chamber 12 by opening the intake port 13. Exhaust gas generated in the combustion chamber 12 is discharged outwardly from the combustion chamber 12 through the exhaust port 14 by opening the exhaust port 14.

The intake port 13 and the exhaust port 14 pass through the outside of the cylinder head 3 and the combustion chamber 12. The intake port 13 extends from the side of the cylinder head 3 to the combustion chamber 12. The intake port 13 is preferably shaped like, for example, the capital letter Y that branches off inside the cylinder head 3 (see FIG. 4). As shown in FIG. 1, the intake port 13 includes a combined passage 15 that extends from the outside of the cylinder head 3 to the inside of the cylinder head 3 and two branch passages 16 each of which extends from an end of the combined passage 15 to the combustion chamber 12. The combined passage 15 is opened at an outer surface of the cylinder head 3, and each branch passage 16 is opened at the combustion chamber 12. As shown in FIG. 1, the intake port 13 includes an opening 13a located at the outer surface of the cylinder head 3 and an opening 13b located at the combustion chamber 12. The intake valve 8 is preferably provided for each branch passage 16, and the opening 13b (intake port) of the branch passage 16 located at the combustion chamber 12 is opened and closed by the corresponding intake valve 8. The exhaust port 14 also communicates with the combustion chamber 12 at two places (not shown), and two exhaust valves 9 are provided for two corresponding openings (exhaust ports), respectively, of the exhaust port 14. In other words, in the first preferred embodiment, two intake valves 8 and two exhaust valves 9 that correspond to the same cylinder 4 are provided.

The engine 1 includes a spark plug 17 that provides sparks in the combustion chamber 12 and a fuel injector 18 that sprays fuel (e.g., gasoline) into the combustion chamber 12. The cylinder head 3 defines a plug housing hole 19 in which the spark plug 17 is inserted and a housing hole 20 and a connection hole 21 in both of which the fuel injector 18 is inserted. The plug housing hole 19 extends along the central axis L2 of the cylinder 4. Therefore, the spark plug 17 extends along the central axis L2 of the cylinder 4. The front end of the spark plug 17 that emits sparks protrudes from the plug housing hole 19, and reaches the combustion chamber 12. The housing hole 20 and the connection hole 21 extend in a direction that inclines with respect to the central axis L2 of the cylinder 4. Therefore, the fuel injector 18 inclines with respect to the central axis L2 of the cylinder 4. The fuel injector 18 inclines with respect to the central axis L2 of the cylinder 4 at an angle greater than the intake valve 8. The fuel injector 18 is disposed outside the spark plug 17 (i.e., in a direction away from the central axis L2 of the cylinder 4).

The housing hole 20 passes through the combustion chamber 12 and the intake port 13, whereas the connection hole 21 passes through the intake port 13 and the outside of the cylinder head 3. Therefore, the housing hole 20 is disposed between the intake port 13 and the combustion chamber 12, whereas the connection hole 21 is disposed on the side opposite to the housing hole 20 with respect to the intake port 13. As shown in FIG. 2, the housing hole 20 includes an opening 20a located at an inner wall 13c of the intake port 13 and an opening 20b located at the combustion chamber 12. The connection hole 21 includes an opening 21a located at an outer surface of the cylinder head 3 and an opening 21b located at an inner wall 13c of the intake port 13. The housing hole 20 and the connection hole 21 face each other with the intake port 13 therebetween. The housing hole 20 and the connection hole 21 are disposed on the same axis that inclines with respect to the central axis L2 of the cylinder 4. The housing hole 20 and the connection hole 21 are opened at the inner wall 13c of the intake port 13. The fuel injector 18 is inserted in the opening 20a that faces the intake port 13 of the housing hole 20 and in the opening 21b that faces the intake port 13 of the connection hole 21. Therefore, the fuel injector 18 penetrates through the inner wall 13c of the intake port 13, and intersects the intake port 13. The fuel injector 18 intersects the intake port 13 outside an inner circumferential surface of the cylinder 4.

The fuel injector 18 preferably is cylindrical, for example. The fuel injector 18 includes a cylindrical forward end portion 18a that extends in an axial direction (i.e., direction along the central axis of the fuel injector 18) and a body portion 18b. The outer diameter of the forward end portion 18a is smaller than that of the body portion 18b. The forward end portion 18a extends from the body portion 18b toward the combustion chamber 12. The forward end portion 18a is shorter than, for example, the body portion 18b. An injection opening through which a mist of fuel is injected is located at the tip of the forward end portion 18a, i.e., is located at the front end of the fuel injector 18. The fuel injector 18 is held by the cylinder head 3. The fuel injector 18 is inserted from the outside of the cylinder head 3 into the housing hole 20 and the connection hole 21. The forward end portion 18a of the fuel injector 18 enters the housing hole 20, whereas the body portion 18b of the fuel injector 18 enters the connection hole 21. The forward end portion 18a and the body portion 18b of the fuel injector 18 further enter the intake port 13. The forward end portion 18a and the body portion 18b are disposed in the intake port 13 in a posture of intersecting the flow of intake air in the intake port 13.

The front end of the fuel injector 18 is disposed in the housing hole 20. The front end of the fuel injector 18 and the inner wall of the housing hole 20 define a concave portion 22 that communicates with the combustion chamber 12. The concave portion 22 is hollowed in a direction away from the combustion chamber 12. As shown in FIG. 2, a portion of the concave portion 22 that is contiguous to the front end of the fuel injector 18 defines an inlet 22a of the concave portion 22, whereas a portion of the concave portion 22 that is contiguous to the combustion chamber 12 (which corresponds to the opening 20b that faces the combustion chamber 12 of the housing hole 20) defines an outlet 22b of the concave portion 22. The area of the outlet 22b of the concave portion 22 is greater than that of the inlet 22a of the concave portion 22. The flow passage area of the concave portion 22 may continuously become greater or may stepwise become greater in proportion to an approach to the outlet 22b of the concave portion 22.

An outer end portion 18c of the fuel injector 18 protrudes from the outer surface of the cylinder head 3. The outer end portion 18c of the fuel injector 18 is disposed on the side opposite to the cylinder body 2 with respect to the intake port 13. Therefore, the intake port 13 is disposed between the cylinder body 2 and the outer end portion 18c of the fuel injector 18. An end of a fuel supply pipe 23 that supplies fuel to the fuel injector 18 is connected to the outer end portion 18c of the fuel injector 18. The fuel injector 18 conically jets fuel, which has been supplied from the fuel supply pipe 23, from its front end toward the combustion chamber 12. A fuel mist jetted from the fuel injector 18 passes through the inlet 22a and then through the outlet 22b of the concave portion 22, and is supplied directly to the combustion chamber 12. The area of the outlet 22b of the concave portion 22 is greater than that of the inlet 22a of the concave portion 22, and therefore the fuel mist that spreads from the front end of the fuel injector 18 toward the combustion chamber 12 can be prevented from colliding with the inner wall of the housing hole 20 inside the concave portion 22 so that the spread of the fuel is narrowed.

As shown in FIG. 1, the housing hole 20 communicates with the combustion chamber 12 at a more distant position than the intake port 13 with respect to the central axis L2 of the cylinder 4. The opening 20b of the housing hole 20 that faces the combustion chamber 12 is disposed outside the opening 13b of the intake port 13 (i.e., opening of the branch passage 16) that faces the combustion chamber 12, and is more distant from the central axis L2 of the cylinder 4 than the opening 13b of the intake port 13. Therefore, the opening 20b of the housing hole 20 that faces the combustion chamber 12 is closer to the inner circumferential surface of the cylinder 4 than the opening 13b of the intake port 13 that faces the combustion chamber 12. The opening 13b of the intake port 13 and the opening 20b of the housing hole 20 are disposed on the same side with respect to a plane that includes the central axis L2 of the cylinder 4 and the rotational axis L1 of the crankshaft 6. Therefore, the opening 13b of the intake port 13 and the front end of the fuel injector 18 are disposed on the same side with respect to the plane that includes the central axis L2 of the cylinder 4 and the rotational axis L1 of the crankshaft 6.

Figure 6:
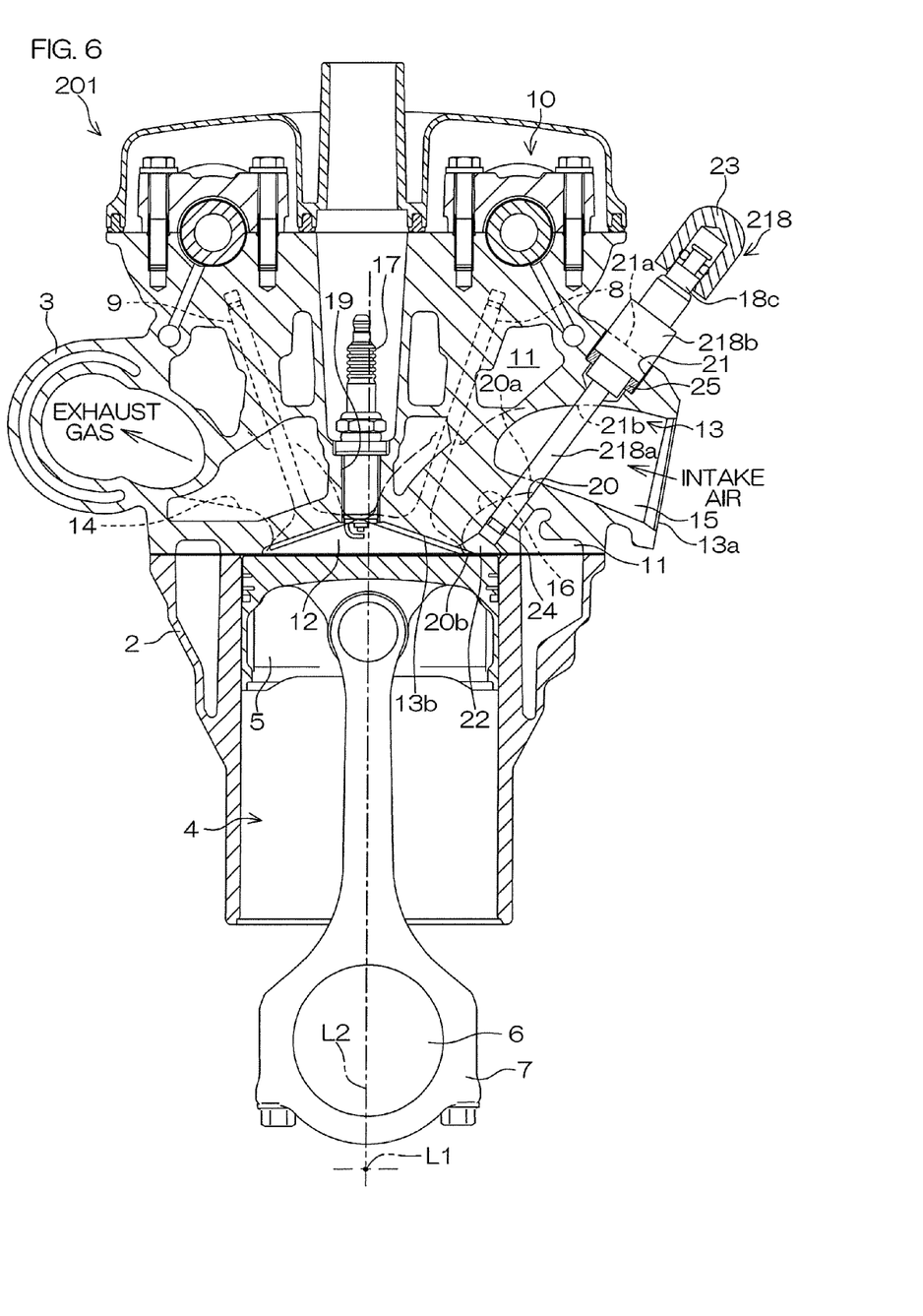
FIG. 6 is a sectional view of an engine according to a second preferred embodiment of the present invention.

The engine 1 includes a first sealing member 24 and a second sealing member 25. The first and second sealing members 24 and 25 preferably are O rings made of, for example, heat resisting material. Fluorine resin, such as polytetrafluoroethylene, can be mentioned as the heat resisting material. The first sealing member 24 is attached to an annular groove provided at the forward end portion 18a of the fuel injector 18, and concentrically surrounds the forward end portion 18a. A gap between the forward end portion 18a and the inner wall of the housing hole 20 is sealed with the first sealing member 24. As a result, a fluid can be prevented from leaking from the combustion chamber 12 to the intake port 13. Likewise, the second sealing member 25 concentrically surrounds the body portion 18b of the fuel injector 18, and a gap between the body portion 18b and the inner wall of the connection hole 21 is sealed with the second sealing member 25. As a result, intake air can be prevented from leaking from the intake port 13 to the outside of the cylinder head 3, or air can be prevented from flowing from the outside of the cylinder head 3 into the intake port 13. The second sealing member 25 may be disposed at the outside of the cylinder head 3 as shown in FIG. 1, or may be disposed in the connection hole 21 (see FIG. 6).

Figure 3:
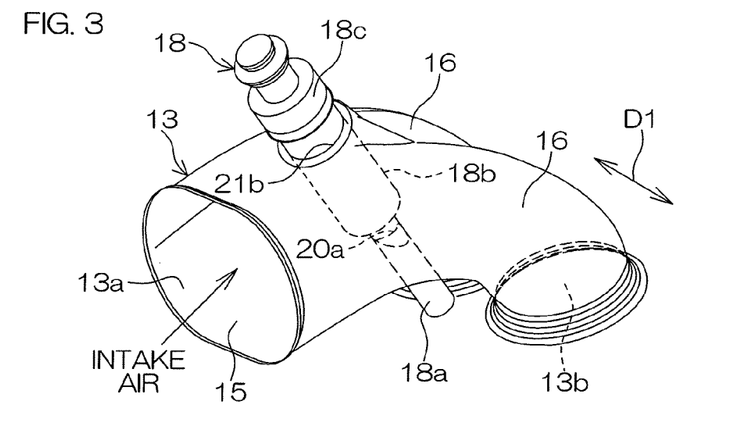
FIG. 3 is a view showing a positional relationship between an intake port and a fuel injector according to the first preferred embodiment of the present invention.
Figure 4:
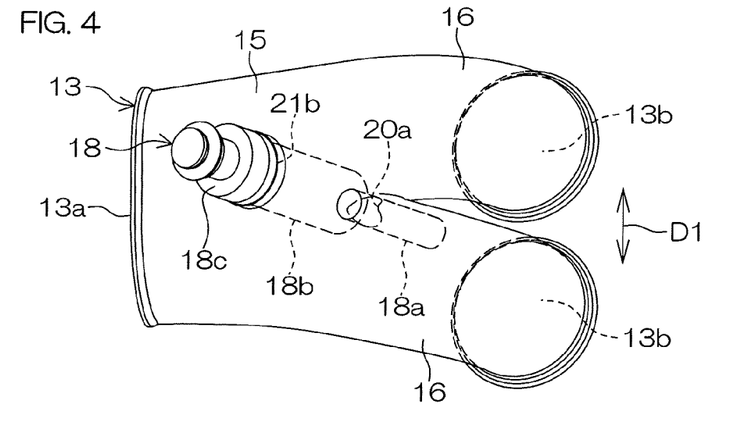
FIG. 4 is a view showing a positional relationship between the intake port and the fuel injector according to the first preferred embodiment of the present invention.
Figure 5:
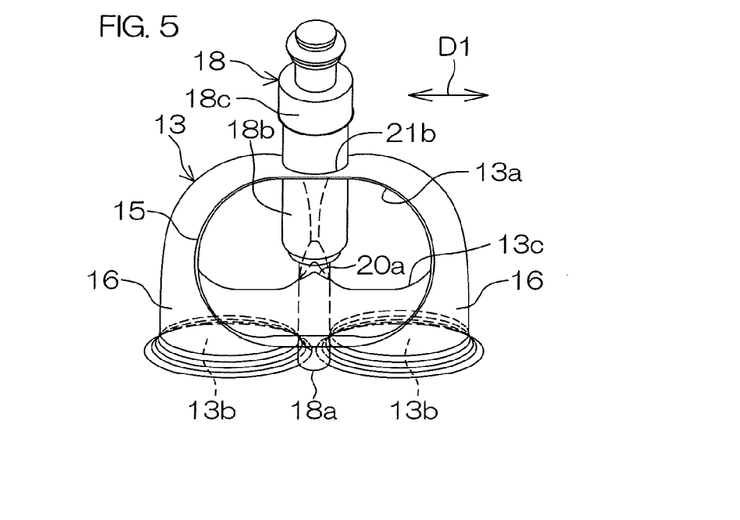
FIG. 5 is a view showing a positional relationship between the intake port and the fuel injector according to the first preferred embodiment of the present invention.

FIG. 3 to FIG. 5 are views showing a positional relationship between the intake port 13 and the fuel injector 18 according to the first preferred embodiment of the present invention.

As described above, the intake port 13 includes the two branch passages 16 that communicate with the combustion chamber 12 and the combined passage 15 in which the two branch passages 16 are combined together. The two branch passages 16 branch off at an end of the combined passage 15. The two branch passages 16 are arranged in the shape of the capital letter V with a space therebetween in a width direction D1. The space between the two branch passages 16 is smaller than the width of the fuel injector 18 (i.e., length in the width direction D1). The opening 13a of the combined passage 15 located at the outer surface of the cylinder head 3 preferably is, for example, an elongated ellipse that is elongated in the width direction D1. The opening 13b of the branch passage 16 located at the combustion chamber 12 preferably is, for example, a circle. The opening 13a of the combined passage 15 is an inlet for intake air, whereas the opening 13b of each branch passage 16 is an outlet for intake air. The area of the opening 13a of the combined passage 15 is greater than that of the opening 13b of the branch passage 16. The flow passage area of the combined passage 15 is greater than that of the branch passage 16.

The fuel injector 18 penetrates through the inner wall of the combined passage 15 at an intermediate portion of the combined passage 15 with respect to the width direction D1. When the intake port 13 and the fuel injector 18 are viewed from the inlet side of intake air, the fuel injector 18 is disposed at a position at which the intake port 13 is halved in the width direction D1. Additionally, when the intake port 13 and the fuel injector 18 are viewed from the inlet side of intake air, the fuel injector 18 overlaps with the two branch passages 16. Intake air that has flowed into the intake port 13 from the opening 13a of the combined passage 15 is branched off into two intake air parts at the joint between the combined passage 15 and the two branch passages 16, and is supplied from the opening 13b of each branch passage 16 to the combustion chamber 12. When the intake port 13 and the fuel injector 18 are viewed from the inlet side of intake air, the fuel injector 18 is not unevenly placed at one of the branch passages 16, and therefore the intake air that has flowed into the combined passage 15 is branched off into two intake air portions such that these two portions become substantially equal to each other in the amount of flow, and flows into each branch passage 16.

As described above, in the first preferred embodiment, the housing hole 20 passing through the combustion chamber 12 and through the intake port 13 is preferably located in the cylinder head 3. Additionally, the connection hole 21 by which the intake port 13 and the outside of the cylinder head 3 are connected together is located in the cylinder head 3. A portion of the fuel injector 18 is disposed at the intake port 13, the housing hole 20, and the connection hole 21. The fuel injector 18 jets a fuel mist toward the combustion chamber 12. The fuel mist jetted from the fuel injector 18 is supplied directly to the combustion chamber 12. Therefore, it is possible to evaporate the fuel in the cylinder 4 and cool the inside of the cylinder 4. Therefore, the output and the fuel efficiency of the four-stroke engine 1 can be improved. Additionally, a portion of the fuel injector 18 is disposed at the intake port 13, and therefore the shape or layout of the intake port 13 is not required to be changed in order to provide a space for disposing the fuel injector 18. Thus, an intake system has a high degree of freedom, and therefore the fluid resistance in the intake port 13 can be decreased. Therefore, a decrease in the amount of air that flows from the intake port 13 to the cylinder 4 can be reduced. Additionally, the intake system has a high degree of freedom, and therefore, for example, the shape of the intake port 13 can be made the same as an arrangement configured to jet fuel to the intake port (so-called port injection).

Additionally, in the first preferred embodiment, the intake port 13 preferably includes the two branch passages 16 and the combined passages 15, and the fuel injector 18 penetrates through the inner wall of the combined passage 15. In a case in which the fuel injector 18 penetrates through the intake port 13, the flow passage area of a portion (penetration portion) of the fuel injector 18 penetrating through the intake port 13 decreases. Therefore, the fluid resistance in the penetration portion increases. However, in this case, the decrease ratio of the flow passage area in the penetration portion is smaller than in a case in which the intake port 13 penetrates through the branch passage 16 because the flow passage area of the combined passage 15 is greater than that of the branch passage 16. Therefore, an influence exerted on intake air flowing toward the combustion chamber 12 can be made smaller than in a case in which the intake port 13 penetrates through the branch passage 16.

Additionally, in the first preferred embodiment, the front end of the fuel injector 18 is disposed at the housing hole 20. In a case in which the front end of the fuel injector 18 is disposed at the combustion chamber 12, the front end of the fuel injector 18 is exposed to high-temperature exhaust gas. Therefore, in this case, the temperature of the front end of the fuel injector 18 rises. Therefore, a rise in temperature of the front end of the fuel injector 18 can be reduced by disposing the front end of the fuel injector 18 at the housing hole 20. As a result, the front end of the fuel injector 18 can be prevented from being blocked with soot that is a carbon deposit.

In detail, soot is easily generated in a high-fuel-concentration and high-temperature atmosphere. An injection opening through which fuel is jetted is provided at the front end of the fuel injector 18, and therefore the fuel concentration is high near the front end of the fuel injector 18. Therefore, when the temperature is high near the front end of the fuel injector 18, soot is easily generated. However, in the first preferred embodiment, the fuel injector 18 is prevented from becoming high in temperature, and therefore the temperature is low near the front end of the fuel injector 18. Therefore, soot can be prevented from being generated. As a result, the front end of the fuel injector 18 can be prevented from being blocked therewith.

Additionally, in the first preferred embodiment, the front end of the fuel injector 18 is disposed at the housing hole 20, and the water jacket 11 to which cooling water is supplied is located at the cylinder head 3. The cylinder head 3 is cooled with cooling water supplied to the water jacket 11, and the fuel injector 18 is cooled with the cylinder head 3. Therefore, in a case in which the front end of the fuel injector 18 is disposed the combustion chamber 12, the front end of the fuel injector 18 is spaced away from the cylinder head 3, and therefore the temperature of the front end of the fuel injector 18 becomes higher than in a case in which the front end of the fuel injector 18 is disposed at the housing hole 20. Therefore, a rise in temperature of the front end of the fuel injector 18 can be reduced, and the front end of the fuel injector 18 can be prevented from being blocked with soot by disposing the front end of the fuel injector 18 at the housing hole 20.

Next, other preferred embodiments of the present invention will be described.

In the first preferred embodiment mentioned above, a description has been given of a case in which the forward end portion 18a and the body portion 18b of the fuel injector 18 preferably enter the combined passage 15. However, only the body portion 18b may enter the combined passage 15. Additionally, an engine 201 according to a second preferred embodiment shown in FIG. 6 may be arranged in which a fuel injector 218 includes a forward end portion 218a that is longer than a body portion 218b and in which only the forward end portion 218a enters the combined passage 15.

Figure 7:
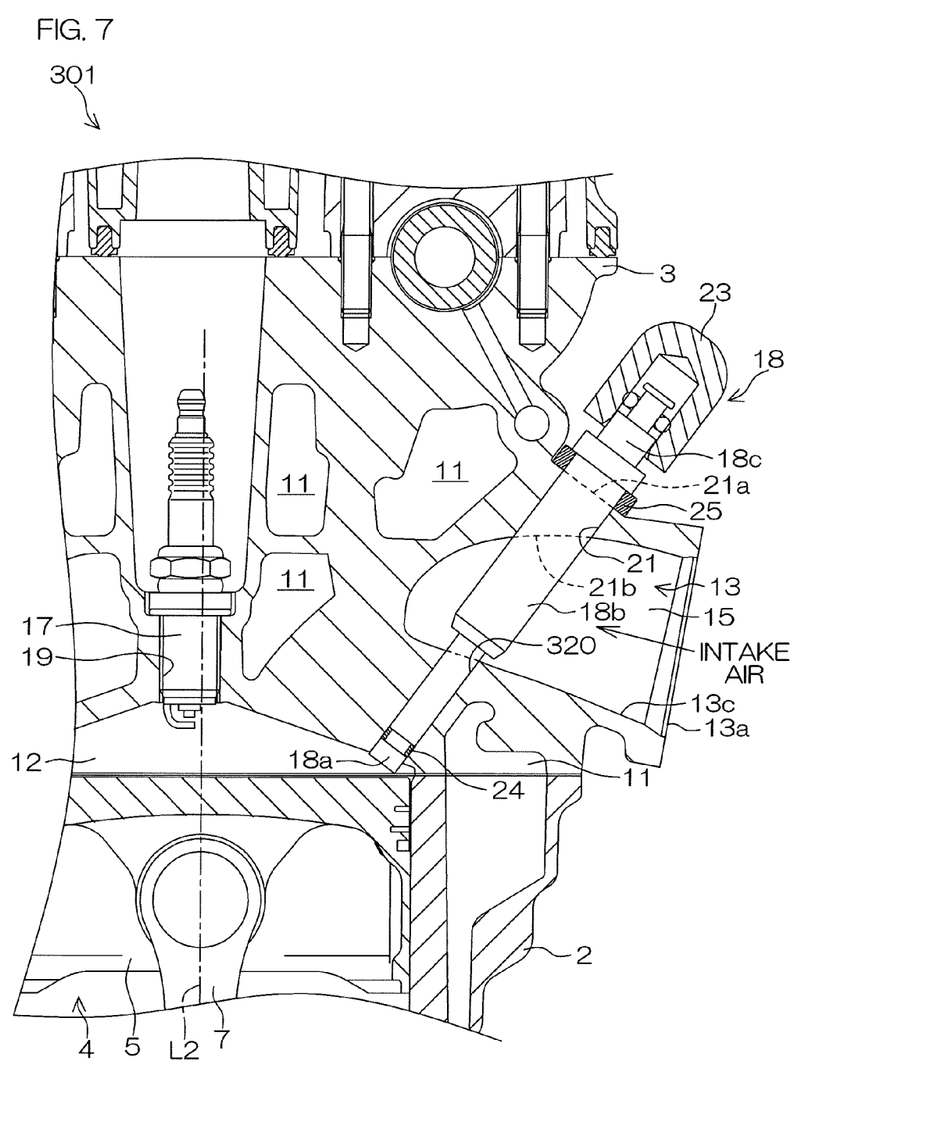
FIG. 7 is a sectional view of an engine according to a third preferred embodiment of the present invention.

Additionally, in the first preferred embodiment mentioned above, a description has been given of a case in which the front end of the fuel injector 18 is preferably disposed at the housing hole 20. However, the fuel injector 18 may be disposed so that a forward end surface of the fuel injector 18 and an inner wall surface of the combustion chamber 12 are contiguous to each other. In other words, a portion around the housing hole 20 in the inner wall surface of the combustion chamber 12 and the forward end surface of the fuel injector 18 may be disposed on the same plane. Additionally, an engine 301 according to a third preferred embodiment shown in FIG. 7 may be arranged in which a housing hole 320 is located so that the front end of the fuel injector 18 reaches the combustion chamber 12 and in which the fuel injector 18 protrudes from the housing hole 320. According to this arrangement, the front end of the fuel injector 18 protrudes from the housing hole 320, and therefore a fuel mist jetted from the fuel injector 18 can be prevented from colliding with the inner wall of the housing hole 320 so that the spread of the fuel is narrowed.

Additionally, in the first preferred embodiment mentioned above, a description has been given of a case in which the fuel injector 18 preferably penetrates through the intake port 13. In other words, in the first preferred embodiment, a description has been given of a case in which the whole circumference of the fuel injector 18 is preferably surrounded by the intake port 13. However, as shown in FIG. 8 to FIG. 13, a portion of the fuel injector 18 may enter intake ports 413 and 513. In other words, an arrangement may be provided in which the periphery of the fuel injector 18 is partially surrounded by the intake ports 413 and 513 and in which a portion that enters the intake ports 413 and 513 and a portion that is exposed from the intake ports 413 and 513 are included in the cross section of the fuel injector 18 perpendicular to the axial direction.

Figure 8:
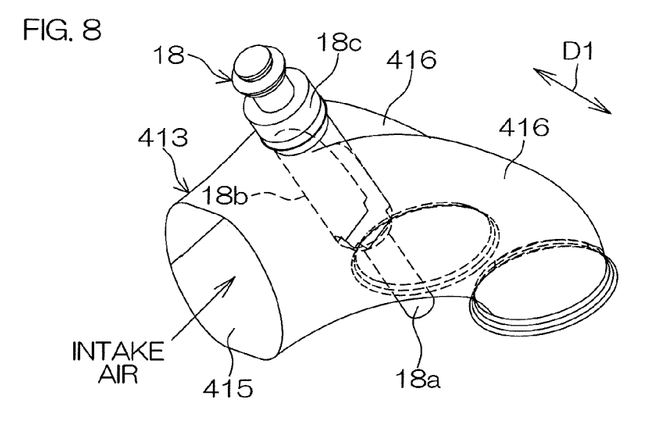
FIG. 8 is a view showing a positional relationship between an intake port and a fuel injector according to a fourth preferred embodiment of the present invention.
Figure 9:
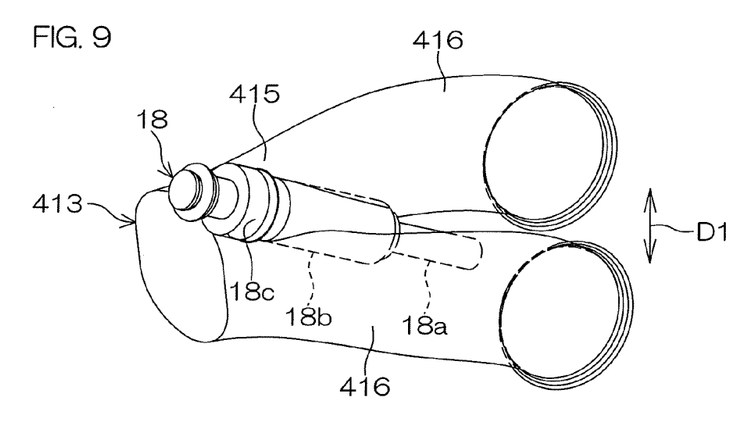
FIG. 9 is a view showing a positional relationship between the intake port and the fuel injector according to the fourth preferred embodiment of the present invention.
Figure 10:
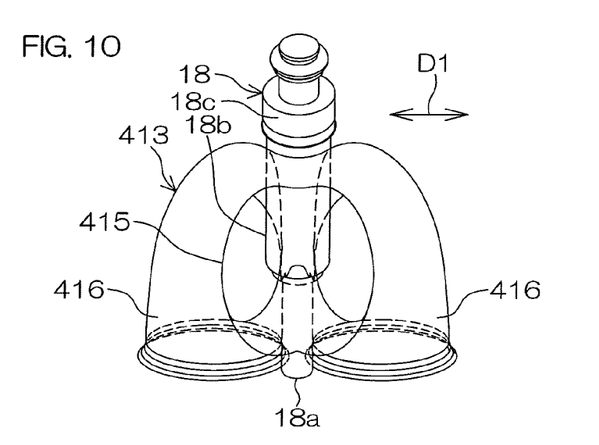
FIG. 10 is a view showing a positional relationship between the intake port and the fuel injector according to the fourth preferred embodiment of the present invention.

In detail, as shown in FIG. 8 to FIG. 10, an intake port 413 according to a fourth preferred embodiment may be arranged so that a portion of the fuel injector 18 is disposed between two branch passages 416. In the fourth preferred embodiment, the body portion 18b enters the combined passage 415, and enters each branch passage 416. Additionally, in the fourth preferred embodiment, the forward end portion 18a may enter the combined passage 415 and each branch passage 416 (not shown).

Figure 11:
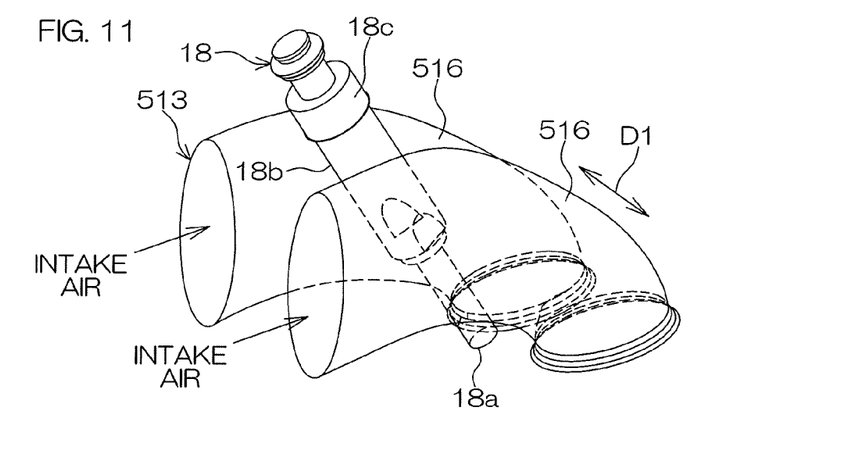
FIG. 11 is a view showing a positional relationship between an intake port and a fuel injector according to a fifth preferred embodiment of the present invention.
Figure 12:
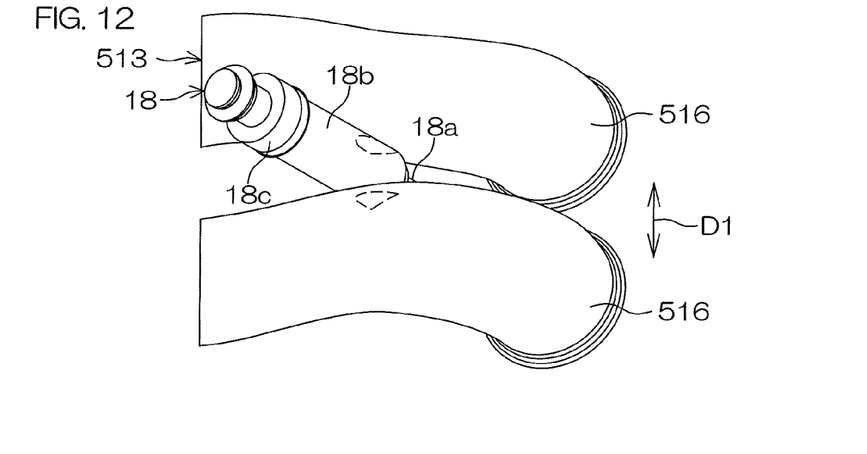
FIG. 12 is a view showing a positional relationship between the intake port and the fuel injector according to the fifth preferred embodiment of the present invention.
Figure 13:
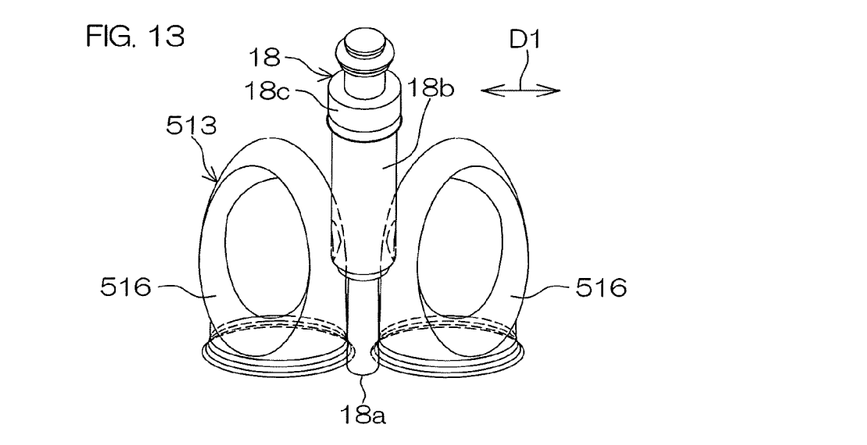
FIG. 13 is a view showing a positional relationship between the intake port and the fuel injector according to the fifth preferred embodiment of the present invention.

Additionally, as shown in FIG. 11 to FIG. 13, an intake port 513 according to a fifth preferred embodiment may be arranged such that the fuel injector 18 is disposed between two branch passages 516 and such that a portion of the body portion 18b enters each branch passage 516. Additionally, in the fifth preferred embodiment, the forward end portion 18a may enter each branch passage 516 (not shown). Additionally, in the fifth preferred embodiment, the two branch passages 516 may be joined to a combined passage shared by these passages 516, or may be independent of each other. In other words, two intake ports that are independent of each other may be provided, and the fuel injector 18 may be disposed between these intake ports.

Additionally, in the first preferred embodiment mentioned above, a description has been given of a case in which the intake port 13 includes the two branch passages 16. However, the intake port 13 may include three or more branch passages 16, for example. Additionally, the intake port 13 may not be branched off. In this case, the number of the intake ports 13 corresponding to the same cylinder 4 may be one, or may be two or more.

In addition, the present invention can be variously modified within the scope of the appended claims.

Non-limiting examples of correspondence relationships between the constituent elements recited in the appended claims and the constituent elements described in the above preferred embodiments are shown below.

Combustion chamber: Combustion chamber 12
Intake port: Intake port 13, 413, 513
Housing hole: Housing hole 20, 320
Cylinder head: Cylinder head 3
Fuel injector: Fuel injector 18, 218
Four-stroke engine: Engine 1, 201, 301
Inner wall of intake port: Inner wall 13c of intake port
Branch passage: Branch passage 16, 416, 516
Combined passage: Combined passage 15, 415
First sealing member: First sealing member 24
Cylinder: Cylinder 4
Cylinder body: Cylinder body 2
Central axis of cylinder: Central axis L2 of cylinder
Connection hole: Connection hole 21
Second sealing member: Second sealing member 25
Body portion: Body portion 18b
Forward end portion: Forward end portion 18a, 218a The present application corresponds to Japanese Patent Application No. 2011-116254 filed in the Japan Patent Office on May 24, 2011, and the entire disclosure of the application is incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A four-stroke engine comprising:
   a cylinder head including a combustion chamber, an intake port that communicates with the combustion chamber, a connection hole arranged to connect the intake port and an outside of the cylinder head, and a housing hole arranged to connect the combustion chamber and the intake port, the connection hole including an opening located at an outer surface of the cylinder head and an opening located at an inner wall of the intake port; and
   a fuel injector that supplies a mist of fuel directly to the combustion chamber by jetting the mist of fuel toward the combustion chamber; wherein
   the fuel injector includes a body portion and a forward end portion that is connected to the body portion and thinner than the body portion;
   a first portion of the body portion is located within the intake port, a second portion of the body portion is located within the connection hole, and a third portion of the body portion is located outside the cylinder head;
   a portion of the forward end portion is located within the housing hole such that the forward end portion supplies the mist of fuel directly to the combustion chamber;
   the intake port includes a plurality of branch passages that communicate with the combustion chamber and a combined passage in which the plurality of branch passages are combined together; and
   the body portion penetrates through the connection hole such that a front end of the body portion is disposed in the combined passage.

2. The four-stroke engine according to claim 1, wherein the fuel injector penetrates through the inner wall of the intake port.

3. The four-stroke engine according to claim 2, wherein the fuel injector penetrates through an inner wall of the combined passage.

4. The four-stroke engine according to claim 1, wherein the fuel injector is located in a portion of at least one of the plurality of branch passages.

5. The four-stroke engine according to claim 1, further comprising a cylinder body including a cylinder, wherein the housing hole communicates with the combustion chamber at a more distant position than a position of the intake port with respect to a central axis of the cylinder.

6. The four-stroke engine according to claim 1, further comprising a cylinder body including a cylinder, wherein the fuel injector is inclined with respect to a central axis of the cylinder.

7. The four-stroke engine according to claim 4, wherein the fuel injector penetrates through an inner wall of the intake port.

8. The four-stroke engine according to claim 3, wherein the fuel injector is located in a portion of at least one of the plurality of branch passages.

9. The four-stroke engine according to claim 4, further comprising a cylinder body including a cylinder, wherein the housing hole communicates with the combustion chamber at a more distant position than a position of the intake port with respect to a central axis of the cylinder.

10. The four-stroke engine according to claim 4, further comprising a cylinder body including a cylinder, wherein the fuel injector is inclined with respect to a central axis of the cylinder.

11. The four-stroke engine according to claim 1, further comprising:
a first sealing member that seals a gap between the fuel injector and the housing hole; and
a second sealing member that seals a gap between the fuel injector and the connection hole; wherein
the first portion of the body portion is exposed to the intake port between the first sealing member and the second sealing member.

12. The four-stroke engine according to claim 1, wherein the housing hole and the connection hole are separate from each other.

* * * * *